US008534025B2

(12) United States Patent
De Abreu (10) Patent No.: US 8,534,025 B2
(45) Date of Patent: Sep. 17, 2013

(54) METALLIC TOWER

(75) Inventor: Paulo Emmanuel De Abreu, Curitiba (BR)

(73) Assignee: Seccional Brasil SA, Curitiba (BR)

(*) Notice: Subject to any disclaimer, the term of this patent is extended or adjusted under 35 U.S.C. 154(b) by 0 days.

(21) Appl. No.: 13/143,006

(22) PCT Filed: Dec. 31, 2008

(86) PCT No.: PCT/IB2008/055605
§ 371 (c)(1),
(2), (4) Date: Jun. 30, 2011

(87) PCT Pub. No.: WO2010/076606
PCT Pub. Date: Jul. 8, 2010

(65) Prior Publication Data
US 2011/0265419 A1    Nov. 3, 2011

(51) Int. Cl.
*E04H 12/00* (2006.01)
(52) U.S. Cl.
USPC .................................. 52/651.01; 52/651.02
(58) Field of Classification Search
USPC ............. 52/648.1, 650.2, 651.01, 638, 846
See application file for complete search history.

(56) References Cited

U.S. PATENT DOCUMENTS

| | | | | |
|---|---|---|---|---|
| 2,145,232 A * | 1/1939 | Bauer | | 52/651.06 |
| 2,388,377 A * | 11/1945 | Albers | | 290/55 |
| 4,982,545 A * | 1/1991 | Stromback | | 52/639 |
| 5,054,197 A * | 10/1991 | Kato et al. | | 29/897.31 |
| 7,275,734 B2 * | 10/2007 | Bland et al. | | 261/28 |
| 8,393,118 B2 * | 3/2013 | Fang et al. | | 52/167.1 |
| 2006/0053727 A1 * | 3/2006 | Bland et al. | | 52/648.1 |
| 2006/0277843 A1 * | 12/2006 | Livingston et al. | | 52/110 |

FOREIGN PATENT DOCUMENTS

| | | |
|---|---|---|
| CN | 2739266 Y | 11/2005 |
| CN | 2764872 Y | 3/2006 |
| CN | 2809810 Y | 8/2006 |
| DE | 1509022 A | 1/1969 |
| DE | 2503566 A1 | 10/1975 |
| FR | 61623 E | 5/1955 |
| GB | 310297 A | 4/1929 |
| GB | 1474559 A | 5/1977 |
| WO | 87/04204 A | 7/1987 |
| WO | 2009098524 A1 | 8/2009 |

OTHER PUBLICATIONS

European Standard prEN 1993-3-1:2004, Eurocode 3, Design of steel structures, Part 3-1: Towers, masts and chimneys—Towers and masts.
International Search Report and Written Opinion from corresponding International Application No. PCT/IB2008/055605, dated Feb. 9, 2009.
English Translation of Office Action from corresponding Chinese Application No. 200880132586.X mailed Mar. 12, 2013.
English Translation of Search Report from corresponding Chinese Application No. 200880132586.X dated Jan. 28, 2013.

* cited by examiner

*Primary Examiner* — Brian Glessner
*Assistant Examiner* — Paola Agudelo
(74) *Attorney, Agent, or Firm* — Lando & Anastasi, LLP (57) ABSTRACT

This invention relates to metallic towers or the like utilized for electric power transmission lines, telecommunications, wind energy generators and other applications. The standard sections used in lattice towers of the prior art have structural and aerodynamic deficiencies. To overcome the drawbacks and problems the prior art one aspect of the present invention is directed to a metallic tower comprising lattice members with a channel section, wherein the length of the channel web is smaller than the length of the channel legs.

7 Claims, 16 Drawing Sheets

TABLE II.1 ANGLE SECTIONS WITH EQUAL BRIMS

Fy-col (kgf/cm²) 3806
Fy-dia (kgf/cm²) 2551

ACTION OF THE WIND — SURVIVAL WIND
- S2 — V0 — 40,00
- CATEG: III — S1 — 1,00
- CLASS: C — S3 — 1,10

OPERATIONAL WIND: 96,3 km/h
DEFLECTION ANGLE: 0,600

DATA FOR FOUNDATION:
- ET (tf) = 87,21
- EC (tf) = 96,58
- EH (tf) = 4,87

| | |
|---|---|
| STRUCTURE WEIGHT = | 10.166 kg |
| PLATFORM WEIGHT = | 1.522 kg |
| LADDER/CONV WEIGHT = | 1.260 kg |
| BOLTS/FASTENERS WEIGHT = | 466 kg |
| OTHER ACCESSORIES WEIGHT = | 143 kg |
| TOTAL WEIGHT = | 13.558 kg |
| ESTIMATED FOR STANDARD SOIL | |
| Concrete V. (m³): | 25,3 |
| Steel CA-50 (kg): | 1265 |

FIG. 11

TABLE II.2

| MD | H | BASE | S2 | Vk | q | AT | A Ant | p Ant | A Plat | p Plat | A E/E | p E/E | A cab | p cab | M | Q | ET |
|---|---|---|---|---|---|---|---|---|---|---|---|---|---|---|---|---|---|
| | m | mm | | km/h | kgf/m² | m² | m² | kg | m2 | kg | m² | kg | m² | kg | tfm | tf | tf |
| | 70,0 | 1705 | 1,11 | 175,03 | 147,7 | 1,06 | 16,80 | 500 | 3,5 | 1000 | 0,44 | 36 | 0,20 | 16 | | 3,25 | -0,70 |
| 1 | 68,0 | 1705 | 1,10 | 174,56 | 146,9 | 1,06 | | | | | 0,44 | 36 | 0,20 | 16 | 6,50 | 3,50 | 3,28 |
| | 66,0 | 1705 | 1,10 | 174,08 | 146,1 | 0,84 | | | 0,3 | 60 | 0,33 | 27 | 0,15 | 12 | 12,62 | 3,74 | 7,68 |
| | 64,5 | 1705 | 1,10 | 173,61 | 145,3 | 0,84 | | | | | 0,33 | 27 | 0,15 | 12 | 18,23 | 3,93 | 11,43 |
| | 63,0 | 1705 | 1,09 | 173,37 | 144,9 | 0,84 | | | | | 0,33 | 27 | 0,15 | 12 | 24,12 | 4,12 | 15,38 |
| 2 | 61,5 | 1705 | 1,09 | 172,89 | 144,2 | 0,84 | | | 0,3 | 60 | 0,33 | 27 | 0,15 | 12 | 30,29 | 4,35 | 19,48 |
| | 60,0 | 2005 | 1,09 | 172,66 | 143,8 | 1,84 | | | | | 0,66 | 54 | 0,30 | 24 | 40,08 | 4,75 | 23,84 |
| 3 | 57,0 | 2305 | 1,08 | 171,23 | 141,4 | 1,96 | | | | | 0,66 | 54 | 0,30 | 24 | 54,34 | 5,17 | 27,89 |
| | 54,0 | 2605 | 1,07 | 169,80 | 139,1 | 2,28 | | | 0,2 | 38 | 0,66 | 54 | 0,30 | 24 | 69,35 | 5,64 | 31,26 |
| 4 | 51,0 | 2905 | 1,06 | 168,38 | 136,7 | 2,46 | | | | | 0,66 | 54 | 0,30 | 24 | 86,32 | 6,11 | 34,67 |
| | 48,0 | 3205 | 1,06 | 167,27 | 134,9 | 2,61 | | | | | 0,66 | 54 | 0,30 | 24 | 104,68 | 6,59 | 37,92 |
| 5 | 45,0 | 3505 | 1,05 | 166,32 | 133,4 | 2,76 | | | 0,6 | 250 | 0,66 | 54 | 0,30 | 24 | 124,48 | 7,17 | 40,95 |
| 6 | 42,0 | 4105 | 1,04 | 165,37 | 131,9 | 5,90 | | | | | 1,32 | 108 | 0,60 | 48 | 155,49 | 8,20 | 44,94 |
| 7 | 36,0 | 4705 | 1,02 | 162,20 | 126,9 | 6,50 | | | 0,2 | 38 | 1,32 | 108 | 0,60 | 48 | 204,89 | 9,29 | 51,06 |
| 8 | 30,0 | 5305 | 1,00 | 158,40 | 121,0 | 7,02 | | | | | 1,32 | 108 | 0,60 | 48 | 260,82 | 10,38 | 57,13 |
| 9 | 24,0 | 5905 | 0,98 | 154,60 | 115,3 | 7,55 | | | 0,2 | 38 | 1,32 | 108 | 0,60 | 48 | 323,20 | 11,49 | 63,09 |
| 10 | 18,0 | 6505 | 0,95 | 150,16 | 108,7 | 8,08 | | | | | 1,32 | 108 | 0,60 | 48 | 392,25 | 12,58 | 69,00 |
| 11 | 12,0 | 7105 | 0,90 | 142,56 | 98,0 | 8,75 | | | 0,2 | 38 | 1,32 | 108 | 0,60 | 48 | 467,79 | 13,64 | 74,87 |
| 12 | 6,0 | 7705 | 0,83 | 131,79 | 83,8 | 9,67 | | | | | 1,32 | 108 | 0,60 | 48 | 592,23 | 14,62 | 87,21 |

FIG. 12

TABLE II.3

| MD | Ld | OCOL | eCOL | LDIA | eDIA | Ldg sec | e | Lc | h | e | ED | RD (tf) | EC | RC | PMOD | SOMAP |
|---|---|---|---|---|---|---|---|---|---|---|---|---|---|---|---|---|
|  | mm | mm | mm | mm | mm | mm | mm | mm | m | m | tf | 1,30*ED | tf | tf | tf | tf |
| 1 | 1155 | 105,0 | 3,00 | 50,80 | 4,76 |  |  | 2000 | 1,0 |  | 1,67 | 4,75 | 4,75 | 29,98 | 1,054 | 1,054 |
|  | 1155 | 105,0 | 3,00 | 50,80 | 4,76 |  |  | 2000 | 1,0 |  | 1,80 | 4,75 | 9,28 | 29,98 | 1,149 | 2,203 |
|  | 998 | 105,0 | 3,00 | 50,80 | 4,76 |  |  | 1500 | 1,0 |  | 1,66 | 5,72 | 13,14 | 32,70 | 0,197 | 2,400 |
|  | 998 | 105,0 | 3,00 | 50,80 | 4,76 |  |  | 1500 | 1,0 |  | 1,74 | 5,72 | 17,19 | 32,70 | 0,175 | 2,576 |
| 2 | 998 | 105,0 | 3,00 | 50,80 | 4,76 |  |  | 1500 | 1,0 |  | 1,83 | 5,72 | 21,42 | 32,70 | 0,145 | 2,721 |
|  | 998 | 105,0 | 3,00 | 50,80 | 4,76 |  |  | 1500 | 1,0 |  | 1,93 | 5,72 | 25,95 | 32,70 | 0,186 | 2,907 |
|  | 1671 | 123,8 | 3,00 | 50,80 | 4,76 |  |  | 1500 | 18,4 | 8,4 | 1,63 | 2,68 | 30,20 | 39,81 | 0,250 | 3,157 |
| 3 | 1759 | 131,3 | 3,00 | 50,80 | 4,76 |  |  | 1500 | 21,4 | 10,5 | 1,50 | 2,46 | 33,82 | 42,62 | 0,317 | 3,474 |
|  | 1832 | 138,8 | 3,00 | 50,80 | 4,76 |  |  | 1500 | 24,4 | 12,3 | 1,48 | 4,26 | 37,50 | 45,41 | 0,367 | 3,841 |
| 4 | 1932 | 146,3 | 3,00 | 63,50 | 4,76 |  |  | 1500 | 27,4 | 14,1 | 1,46 | 3,91 | 41,03 | 48,20 | 0,408 | 4,249 |
|  | 2038 | 153,8 | 3,00 | 63,50 | 4,76 |  |  | 1500 | 30,4 | 15,9 | 1,47 | 3,58 | 44,45 | 63,38 | 0,423 | 4,672 |
| 5 | 2147 | 161,3 | 3,75 | 63,50 | 4,76 |  |  | 1500 | 33,4 | 17,4 | 1,54 | 3,28 | 48,99 | 66,85 | 0,577 | 5,249 |
| 6 | 1763 | 172,5 | 3,75 | 63,50 | 4,76 | 50,8 | 4,76 | 1500 | 37,8 | 19,0 | 2,54 | 4,53 | 55,81 | 72,06 | 0,839 | 6,088 |
| 7 | 1843 | 187,5 | 3,75 | 63,50 | 4,76 | 50,8 | 4,76 | 1500 | 43,8 | 22,0 | 2,60 | 4,22 | 62,62 | 79,00 | 1,037 | 7,126 |
| 8 | 1932 | 202,5 | 3,75 | 63,50 | 4,76 | 50,8 | 4,76 | 1500 | 49,8 | 25,1 | 2,67 | 3,91 | 69,42 | 85,95 | 1,119 | 8,245 |
| 9 | 2028 | 217,5 | 3,75 | 63,50 | 6,35 | 50,8 | 4,76 | 1500 | 55,8 | 28,1 | 2,78 | 4,66 | 76,25 | 92,92 | 1,251 | 9,495 |
| 10 | 2129 | 232,5 | 3,75 | 63,50 | 6,35 | 50,8 | 4,76 | 1500 | 61,8 | 31,2 | 2,89 | 4,29 | 83,10 | 99,92 | 1,385 | 10,881 |
| 11 | 2236 | 247,5 | 3,75 | 63,50 | 6,35 | 50,8 | 4,76 | 1500 | 67,8 | 34,3 | 3,00 | 3,94 | 96,58 | 106,96 | 1,465 | 12,345 |
| 12 | 2339 | 262,5 | 4,25 | 76,20 | 6,35 | 50,8 | 4,76 | 1500 | 73,8 | 40,5 | 2,83 | 6,11 |  | 129,01 | 1,710 | 14,056 |

FIG. 13

TABLE III.1 CHANNEL SECTIONS WITH REDUCED WEB

| | Fy-col (kgf/cm2) | 3806 | | |
|---|---|---|---|---|
| | Fy-dia (kgf/cm2) | 3806 | | |
| ACTION OF THE WIND | SURVIVAL WIND | | STRUCTURE WEIGHT = | 7.443 kg |
| S2 | V0 | 40,00 | PLATFORM WEIGHT = | 1.522 kg |
| CATEG: III | S1 | 1,00 | LADDER/CONV WEIGHT = | 1.260 kg |
| | | | BOLTS/FASTENERS WEIGHT = | 378 kg |
| CLASS: C | S3 | 1,10 | PESO DEMAIS ACES. = | 143 kg |
| OPERATIONAL WIND: | 96,3 km/h | | TOTAL WEIGHT = | 10.746 kg |
| DEFLECTION ANGLE: | 0,600 | | | |
| DATA FOR FOUNDATION: | | | ESTIMATED FOR STANDARD SOIL | |
| ET (tf)= 80,74 | | | Concrete V. (m³): | 23,7 |
| EC (tf)= 88,43 | | | Steel CA-50 (kg): | 1184 |
| EH (tf)= 4,36 | | | | |

FIG. 14

TABLE III.2

| MD | H | BASE | S2 | Vk | q | AT | A Ant | p Ant | A Plat | p Plat | A E/E | p E/E | A cab | p cab | M | Q | ET |
|---|---|---|---|---|---|---|---|---|---|---|---|---|---|---|---|---|---|
| | m | mm | | km/h | kgf/m² | m² | m² | kg | m² | kg | m² | kg | m² | kg | tfm | tf | tf |
| 1 | 70,0 | 1705 | 1,11 | 175,03 | 147,7 | 0,92 | 16,80 | 500 | 3,5 | 1000 | 0,40 | 36 | 0,20 | 16 | | 3,22 | -0,69 |
| | 68,0 | 1705 | 1,10 | 174,56 | 146,9 | 0,92 | | | | | 0,40 | 36 | 0,20 | 16 | 6,45 | 3,45 | 3,27 |
| | 66,0 | 1705 | 1,10 | 174,08 | 146,1 | 0,71 | | | 0,3 | 60 | 0,30 | 27 | 0,15 | 12 | 12,48 | 3,66 | 7,61 |
| | 64,5 | 1705 | 1,10 | 173,61 | 145,3 | 0,71 | | | | | 0,30 | 27 | 0,15 | 12 | 17,97 | 3,83 | 11,29 |
| | 63,0 | 1705 | 1,09 | 173,37 | 144,9 | 0,71 | | | | | 0,30 | 27 | 0,15 | 12 | 23,71 | 4,00 | 15,15 |
| | 61,5 | 1705 | 1,09 | 172,89 | 144,2 | 0,71 | | | 0,3 | 60 | 0,30 | 27 | 0,15 | 12 | 29,71 | 4,21 | 19,14 |
| 2 | 60,0 | 2005 | 1,09 | 172,66 | 143,8 | 1,60 | | | | | 0,60 | 54 | 0,30 | 24 | 39,18 | 4,57 | 23,35 |
| | 57,0 | 2305 | 1,08 | 171,23 | 141,4 | 1,71 | | | | | 0,60 | 54 | 0,30 | 24 | 52,89 | 4,94 | 27,20 |
| 3 | 54,0 | 2605 | 1,07 | 169,80 | 139,1 | 1,90 | | | 0,2 | 38 | 0,60 | 54 | 0,30 | 24 | 67,24 | 5,36 | 30,38 |
| 4 | 51,0 | 2905 | 1,06 | 168,38 | 136,7 | 2,05 | | | | | 0,60 | 54 | 0,30 | 24 | 83,34 | 5,76 | 33,56 |
| | 48,0 | 3205 | 1,06 | 167,27 | 134,9 | 2,17 | | | | | 0,60 | 54 | 0,30 | 24 | 100,64 | 6,17 | 36,56 |
| 5 | 45,0 | 3505 | 1,05 | 166,32 | 133,4 | 2,29 | | | 0,6 | 250 | 0,60 | 54 | 0,30 | 24 | 119,18 | 6,68 | 39,33 |
| 6 | 42,0 | 4105 | 1,04 | 165,37 | 131,9 | 4,98 | | | | | 1,20 | 108 | 0,60 | 48 | 148,06 | 7,57 | 42,95 |
| 7 | 36,0 | 4705 | 1,02 | 162,20 | 126,9 | 5,41 | | | 0,2 | 38 | 1,20 | 108 | 0,60 | 48 | 193,68 | 8,51 | 48,48 |
| 8 | 30,0 | 5305 | 1,00 | 158,40 | 121,0 | 5,84 | | | | | 1,20 | 108 | 0,60 | 48 | 244,89 | 9,44 | 53,90 |
| 9 | 24,0 | 5905 | 0,98 | 154,60 | 115,3 | 6,48 | | | 0,2 | 38 | 1,20 | 108 | 0,60 | 48 | 301,62 | 10,41 | 59,19 |
| 10 | 18,0 | 6505 | 0,95 | 150,16 | 108,7 | 6,93 | | | | | 1,20 | 108 | 0,60 | 48 | 364,19 | 11,36 | 64,45 |
| 11 | 12,0 | 7105 | 0,90 | 142,56 | 98,0 | 7,39 | | | 0,2 | 38 | 1,20 | 108 | 0,60 | 48 | 432,43 | 12,28 | 69,67 |
| 12 | 6,0 | 7705 | 0,83 | 131,79 | 83,8 | 7,84 | | | | | 1,20 | 108 | 0,60 | 48 | 544,46 | 13,09 | 80,74 |

FIG. 15

TABLE III.3

| MD | Ld mm | OCOL mm | eCOL mm | LDIA mm | eDIA mm | Ldg sec mm | e mm | Lc mm | h m | e m | ED tf | RD (tf) 1,30*ED | EC tf | RC tf | PMOD tf | SOMAP tf |
|---|---|---|---|---|---|---|---|---|---|---|---|---|---|---|---|---|
| 1 | 1187 | 105,0 | 3,00 | 30,00 | 2,50 | | | 2000 | 1,0 | | 1,66 | 3,90 | | 29,98 | 1,042 | 1,042 |
|  | 1187 | 105,0 | 3,00 | 30,00 | 2,50 | | | 2000 | 1,0 | | 1,77 | 3,90 | 4,71 | 29,98 | 1,124 | 2,166 |
|  | 1026 | 105,0 | 3,00 | 30,00 | 2,50 | | | 1500 | 1,0 | | 1,63 | 4,71 | 9,17 | 32,70 | 0,174 | 2,340 |
|  | 1026 | 105,0 | 3,00 | 30,00 | 2,50 | | | 1500 | 1,0 | | 1,70 | 4,71 | 12,95 | 32,70 | 0,152 | 2,492 |
|  | 1026 | 105,0 | 3,00 | 30,00 | 2,50 | | | 1500 | 1,0 | | 1,78 | 4,71 | 16,89 | 32,70 | 0,122 | 2,614 |
| 2 | 1026 | 105,0 | 3,00 | 30,00 | 2,50 | | | 1500 | 1,0 | | 1,87 | 4,71 | 20,99 | 32,70 | 0,163 | 2,777 |
|  | 1714 | 123,8 | 3,00 | 30,00 | 2,50 | | | 1500 | 18,4 | 8,6 | 1,55 | 2,20 | 25,35 | 39,81 | 0,214 | 2,991 |
| 3 | 1798 | 131,3 | 3,00 | 30,00 | 2,50 | | | 1500 | 21,4 | 10,7 | 1,41 | 2,03 | 29,37 | 42,62 | 0,263 | 3,254 |
|  | 1878 | 138,8 | 3,00 | 30,00 | 3,00 | | | 1500 | 24,4 | 12,6 | 1,37 | 3,68 | 32,75 | 45,41 | 0,305 | 3,559 |
| 4 | 1975 | 146,3 | 3,00 | 30,00 | 3,00 | | | 1500 | 27,4 | 14,5 | 1,34 | 3,39 | 36,16 | 48,20 | 0,336 | 3,895 |
|  | 2078 | 153,8 | 3,00 | 36,00 | 3,00 | | | 1500 | 30,4 | 16,3 | 1,34 | 3,11 | 39,39 | 63,38 | 0,343 | 4,238 |
| 5 | 2186 | 161,3 | 3,00 | 36,00 | 3,00 | | | 1500 | 33,4 | 17,8 | 1,39 | 2,85 | 42,48 | 66,85 | 0,491 | 4,729 |
| 6 | 1791 | 172,5 | 3,75 | 36,00 | 3,00 | 30,0 | 2,50 | 1500 | 37,8 | 19,6 | 2,27 | 3,98 | 46,56 | 72,06 | 0,695 | 5,424 |
| 7 | 1868 | 187,5 | 3,75 | 36,00 | 3,50 | 30,0 | 2,50 | 1500 | 43,8 | 22,8 | 2,30 | 3,71 | 52,64 | 79,00 | 0,816 | 6,240 |
| 8 | 1955 | 202,5 | 3,75 | 36,00 | 3,50 | 30,0 | 2,50 | 1500 | 49,8 | 26,0 | 2,35 | 3,45 | 58,65 | 85,95 | 0,881 | 7,121 |
| 9 | 2044 | 217,5 | 3,75 | 42,00 | 4,00 | 30,0 | 2,50 | 1500 | 55,8 | 29,0 | 2,44 | 5,61 | 64,59 | 92,92 | 0,973 | 8,094 |
| 10 | 2145 | 232,5 | 3,75 | 42,00 | 4,00 | 30,0 | 2,50 | 1500 | 61,8 | 32,0 | 2,54 | 5,19 | 70,56 | 99,92 | 1,064 | 9,158 |
| 11 | 2251 | 247,5 | 3,75 | 42,00 | 4,00 | 30,0 | 2,50 | 1500 | 67,8 | 35,2 | 2,62 | 4,79 | 76,52 | 106,96 | 1,119 | 10,277 |
| 12 | 2362 | 262,5 | 3,75 | 42,00 | 4,00 | 30,0 | 2,50 | 1500 | 73,8 | 41,6 | 2,45 | 4,42 | 88,43 | 114,07 | 1,257 | 11,534 |

FIG. 16

TABLE IV.1 CHANNEL SECTIONS WITH REDUCED WEB

| | | Fy-col (kgf/cm²) | 3806 | | |
|---|---|---|---|---|---|
| | | Fy-dia (kgf/cm²) | 3806 | | |
| ACTION OF THE WIND | | SURVIVAL WIND | | STRUCTURE WEIGHT = | 6.534 kg |
| S2 | V0 | 40,00 | | PLATFORM WEIGHT = | 1.522 kg |
| CATEG: | III | S1 | 1,00 | LADDER/CONV WEIGHT = | 1.260 kg |
| CLASS: | C | S3 | 1,10 | BOLTS/FASTENERS WEIGHT = | 248 kg |
| OPERATIONAL WIND: | 96,3 km/h | | | OTHER ACCESSORIES WEIGHT = | 143 kg |
| DEFLECTION ANGLE: | 0,600 | | | TOTAL WEIGHT = | 9.707 kg |
| DATA FOR FOUNDATION: | | | | ESTIMATED FOR STANDARD SOIL | |
| ET (tf)= | 61,1 | | | Concreto V. (m³): | 18,8 |
| EC (tf)= | 68,05 | | | Aço CA-50 (kg): | 750 |
| EH (tf)= | 3,01 | | | | |

FIG. 17

TABLE IV.2

| MD | H m | BASE mm | S2 | Vk km/h | q kgf/m² | AT m² | A Ant m² | p Ant kg | A Plat m² | p Plat kg | A E/E m² | p E/E kg | A cab m² | p cab kg | M tfm | Q tf | ET tf |
|---|---|---|---|---|---|---|---|---|---|---|---|---|---|---|---|---|---|
|  | 70,0 | 1705 | 1,11 | 175,03 | 147,7 | 0,41 | 16,80 | 500 | 3,5 | 1000 | 0,40 | 36 | 0,20 | 16 |  | 3,15 | -0,69 |
| 1 | 68,0 | 1705 | 1,10 | 174,56 | 146,9 | 0,41 |  |  |  |  | 0,40 | 36 | 0,20 | 16 | 6,30 | 3,30 | 3,17 |
|  | 66,0 | 1705 | 1,10 | 174,08 | 146,1 | 0,32 |  |  | 0,3 | 60 | 0,30 | 27 | 0,15 | 12 | 12,07 | 3,45 | 7,34 |
|  | 64,5 | 1705 | 1,10 | 173,61 | 145,3 | 0,32 |  |  |  |  | 0,30 | 27 | 0,15 | 12 | 17,25 | 3,57 | 10,80 |
|  | 63,0 | 1705 | 1,09 | 173,37 | 144,9 | 0,32 |  |  |  |  | 0,30 | 27 | 0,15 | 12 | 22,60 | 3,68 | 14,39 |
| 2 | 61,5 | 1705 | 1,09 | 172,89 | 144,2 | 0,32 |  |  | 0,3 | 60 | 0,30 | 27 | 0,15 | 12 | 28,12 | 3,83 | 18,06 |
|  | 60,0 | 2005 | 1,09 | 172,66 | 143,8 | 0,66 |  |  |  |  | 0,60 | 54 | 0,30 | 24 | 36,74 | 4,06 | 21,84 |
| 3 | 57,0 | 2305 | 1,08 | 171,23 | 141,4 | 0,71 |  |  |  |  | 0,60 | 54 | 0,30 | 24 | 48,91 | 4,28 | 25,08 |
|  | 54,0 | 2605 | 1,07 | 169,80 | 139,1 | 0,81 |  |  | 0,2 | 38 | 0,60 | 54 | 0,30 | 24 | 61,36 | 4,52 | 27,63 |
| 4 | 51,0 | 2905 | 1,06 | 168,38 | 136,7 | 0,86 |  |  |  |  | 0,60 | 54 | 0,30 | 24 | 75,03 | 4,79 | 30,10 |
|  | 48,0 | 3205 | 1,06 | 167,27 | 134,9 | 0,92 |  |  |  |  | 0,60 | 54 | 0,30 | 24 | 89,42 | 5,04 | 32,36 |
| 5 | 45,0 | 3505 | 1,05 | 166,32 | 133,4 | 0,98 |  |  | 0,6 | 250 | 0,60 | 54 | 0,30 | 24 | 104,54 | 5,37 | 34,35 |
| 6 | 42,0 | 4105 | 1,04 | 165,37 | 131,9 | 2,14 |  |  |  |  | 1,20 | 108 | 0,60 | 48 | 127,75 | 5,89 | 36,87 |
| 7 | 36,0 | 4705 | 1,02 | 162,20 | 126,9 | 2,35 |  |  | 0,2 | 38 | 1,20 | 108 | 0,60 | 48 | 163,21 | 6,44 | 40,62 |
| 8 | 30,0 | 5305 | 1,00 | 158,40 | 121,0 | 2,57 |  |  |  |  | 1,20 | 108 | 0,60 | 48 | 201,94 | 6,96 | 44,16 |
| 9 | 24,0 | 5905 | 0,98 | 154,60 | 115,3 | 2,88 |  |  | 0,2 | 38 | 1,20 | 108 | 0,60 | 48 | 243,81 | 7,53 | 47,50 |
| 10 | 18,0 | 6505 | 0,95 | 150,16 | 108,7 | 3,11 |  |  |  |  | 1,20 | 108 | 0,60 | 48 | 289,04 | 8,06 | 50,73 |
| 11 | 12,0 | 7105 | 0,90 | 142,56 | 98,0 | 3,32 |  |  | 0,2 | 38 | 1,20 | 108 | 0,60 | 48 | 337,44 | 8,58 | 53,86 |
| 12 | 6,0 | 7705 | 0,83 | 131,79 | 83,8 | 3,53 |  |  |  |  | 1,20 | 108 | 0,60 | 48 | 415,72 | 9,03 | 61,01 |

FIG. 18

TABLE IV.3

| MD | Ld | oCOL | eCOL | LDIA | eDIA | Ldg sec | e | Lc | h | e | ED | RD (tf) | EC | RC | PMOD | SOMAP |
|---|---|---|---|---|---|---|---|---|---|---|---|---|---|---|---|---|
| | mm | mm | mm | mm | mm | mm | mm | mm | m | m | tf | 1,30*ED | tf | tf | tf | tf |
| 1 | 1187 | 105,0 | 3,00 | 30,00 | 2,50 | | | 2000 | 1,0 | | 1,62 | 3,90 | | 29,98 | 1,042 | 1,042 |
| | 1187 | 105,0 | 3,00 | 30,00 | 2,50 | | | 2000 | 1,0 | | 1,69 | 3,90 | 4,61 | 29,98 | 1,124 | 2,166 |
| | 1026 | 105,0 | 3,00 | 30,00 | 2,50 | | | 1500 | 1,0 | | 1,53 | 4,71 | 8,90 | 32,70 | 0,174 | 2,340 |
| | 1026 | 105,0 | 3,00 | 30,00 | 2,50 | | | 1500 | 1,0 | | 1,58 | 4,71 | 12,46 | 32,70 | 0,152 | 2,492 |
| | 1026 | 105,0 | 3,00 | 30,00 | 2,50 | | | 1500 | 1,0 | | 1,63 | 4,71 | 16,14 | 32,70 | 0,122 | 2,614 |
| 2 | 1026 | 105,0 | 3,00 | 30,00 | 2,50 | | | 1500 | 1,0 | | 1,70 | 4,71 | 19,91 | 32,70 | 0,158 | 2,772 |
| | 1730 | 108,8 | 3,00 | 30,00 | 2,50 | | | 1500 | 18,4 | 9,1 | 1,30 | 2,17 | 23,82 | 34,14 | 0,204 | 2,976 |
| 3 | 1811 | 116,3 | 3,00 | 30,00 | 2,50 | | | 1500 | 21,4 | 11,4 | 1,14 | 2,00 | 27,23 | 36,99 | 0,246 | 3,223 |
| | 1890 | 123,8 | 3,00 | 36,00 | 3,00 | | | 1500 | 24,4 | 13,5 | 1,07 | 3,64 | 29,97 | 39,81 | 0,287 | 3,510 |
| 4 | 1987 | 131,3 | 3,00 | 36,00 | 3,00 | | | 1500 | 27,4 | 15,7 | 1,01 | 3,35 | 32,66 | 42,62 | 0,320 | 3,830 |
| | 2089 | 138,8 | 3,00 | 36,00 | 3,00 | | | 1500 | 30,4 | 17,8 | 0,98 | 3,08 | 35,12 | 45,41 | 0,314 | 4,144 |
| 5 | 2196 | 146,3 | 3,00 | 36,00 | 3,00 | | | 1500 | 33,4 | 19,5 | 1,00 | 2,83 | 37,41 | 48,20 | 0,446 | 4,590 |
| 6 | 1798 | 157,5 | 3,00 | 36,00 | 3,00 | 30,0 | 2,50 | 1500 | 37,8 | 21,7 | 1,56 | 3,95 | 40,35 | 52,37 | 0,622 | 5,211 |
| 7 | 1875 | 172,5 | 3,00 | 36,00 | 3,50 | 30,0 | 2,50 | 1500 | 43,8 | 25,4 | 1,53 | 3,69 | 44,57 | 57,92 | 0,716 | 5,927 |
| 8 | 1961 | 187,5 | 3,00 | 36,00 | 3,50 | 30,0 | 2,50 | 1500 | 49,8 | 29,0 | 1,51 | 3,43 | 48,62 | 63,48 | 0,764 | 6,691 |
| 9 | 2050 | 202,5 | 3,00 | 42,00 | 4,00 | 30,0 | 2,50 | 1500 | 55,8 | 32,4 | 1,54 | 5,58 | 52,52 | 69,04 | 0,837 | 7,528 |
| 10 | 2151 | 217,5 | 3,00 | 42,00 | 4,00 | 30,0 | 2,50 | 1500 | 61,8 | 35,9 | 1,57 | 5,17 | 56,36 | 74,62 | 0,922 | 8,449 |
| 11 | 2256 | 232,5 | 3,00 | 42,00 | 4,00 | 30,0 | 2,50 | 1500 | 67,8 | 39,3 | 1,60 | 4,78 | 60,15 | 80,22 | 0,979 | 9,428 |
| 12 | 2367 | 247,5 | 3,75 | 42,00 | 4,00 | 30,0 | 2,50 | 1500 | 73,8 | 46,0 | 1,46 | 4,41 | 68,05 | 106,96 | 1,129 | 10,557 |

FIG. 19

TABLE V – LIST OF SYMBOLS

| | |
|---|---|
| V0 | Basic wind speed |
| S1 | Topographic factor |
| S2 | Roughness of the land |
| S3 | Statistical factor |
| MD | Number of the pane |
| H ( m ) | Height of the tower corresponding to the pane |
| BASE (mm) | Width of the pane base |
| Vk (km/h) | Speed of the wind in the pane |
| q(kgf/m²) | Obstruction pressure in the pane |
| AT (m²) | Adjusted projected area of the structural elements facing wind |
| H ( m ) | Height of the tower corresponding to the pane |
| dT ( m ) | Distance of the centre of application of the resultant, due to the forces in the equivalent area, in the base pane |
| AAnt ( m²) | Adjusted projected area of the considered antennas |
| PAnt ( kg) | Weight of the considered antennas |
| APlat ( m²) | Adjusted area of the considered platforms |
| PPlat ( kg) | Weight of the considered platforms |
| A E/E ( m² ) | Adjusted area of the considered ladders and conveyors |
| P E/E ( kg) | Weight of the considered ladders and conveyors |
| A cab ( m² ) | Adjusted area of the considered cables |
| P cab ( kg) | Weight of the considered cables |
| dA ( m ) | Distance of the center of the antennas to the base of the pane |
| M (tf.m ) | Moment of the forces acting in the structure, in the base pane |
| Q ( tf ) | Sum of the shear stresses in module considered and higher modules |
| PMOD (tf) | Total weight of the pane |
| SOMAP(tf) | Total weight |
| EC ( tf ) | Compressive load in the columns |
| ET ( tf ) | Tensile load in the columns |
| ALFA (º) | Angle between the diagonal brace and the horizontal |
| 0COL (mm) | Diameter of the column tube |
| eCOL (mm) | Thickness of the column tube |
| LDIA (mm) | Brim of the L angle section / Web of the U Section |
| eDIA (mm) | Thickness of the L angle section / Thickness of the U section |
| Ldgsec(mm) | Brim of the secondary L angle section / Web of the U section |
| e (mm) | Thickness of the secondary L angle section / U section web |
| Lc (mm) | Buckling length of the column |
| Ld (mm) | Buckling length of the diagonal |
| e ( m ) | Eccentricity |
| h ( m ) | Height of the intersection of the columns |
| Fy-col(kgf/cm2) | Yield strength of the column tubes |
| Fy-dia(kgf/cm2) | Yield strength of the diagonals |
| ED ( tf ) | Compressive load of the diagonals |
| RD ( tf ) | Strength of the diagonal (calculated according NBR8800) |
| RC ( tf ) | Strength of the column (calculated according NBR8800) |

FIG. 20

METALLIC TOWER

TECHNICAL FIELD

This invention relates to metallic towers or the like utilized for electric power transmission lines, telecommunications, wind energy generators and other applications.

BACKGROUND ART

Towers or the like utilized for electric power transmission lines, telecommunications, wind energy generators and other applications are well known in the prior art. The structural designs, components and materials of such towers vary depending upon the application. Nevertheless, due to structural design and cost constraints, it is very common to use metallic lattice towers in high voltage electric power transmission and telecommunications applications.

In such lattice towers, the skilled in the art usually adopt the standard sections such as the ones described in the European Standard prEN 1993-3-1:2004—Eurocode 3: Design of steel structures, Part 3.1.: Towers, masts and chimneys—Towers and masts.

DISCLOSURE OF INVENTION

Technical Problem

The standard plane sections usually have different values for the radius of gyration according to the symmetry axis of each section. The critical load for dimensioning the truss members is the buckling load under axial compressive stress. As truss members are structurally slender, the critical load is proportional to the square of the gyration radius where it is adopted the minimum gyration radius of the section, the utilization of the greater strength in the other axes is hindered. In addition, the standard sections with plane faces, besides having different radius of gyration in each axis, have sharp edges and were not conceived for reducing the aerodynamic forces on the towers.

Technical Solution

To overcome the drawbacks and problems described above and other disadvantages not mentioned herein, in accordance with the purposes of the invention, as embodied and broadly described herein, one aspect of the present invention is directed to a metallic tower comprising lattice members with a channel section, wherein the length of the channel web is smaller than the length of the channel legs.

In accordance with one aspect of the invention, the channel section with reduced web has equal gyration radius in all axes.

In accordance with one aspect of the invention, the lattice members with the channel section with reduced web are the bracing diagonal members.

In accordance with one aspect of the invention, the lattice members with the channel section with reduced web are the horizontal bars.

In accordance with another aspect of the invention, the lattice members with the channel section with reduced web are positioned in the tower with minimum area facing the wind.

In accordance with another aspect of the invention, channel section with reduced web has a more aerodynamic profile, and with less area facing the wind.

In accordance with another aspect of the invention, the channel section with reduced web has rounded edges.

In accordance with another aspect of the invention, the channel section with reduced web has stiffener elements.

In accordance with another aspect of the invention, the channel section with reduced web is covered by a cowling with an optimized aerodynamic profile.

ADVANTAGEOUS EFFECTS

The present invention has several advantages over the prior art. By adopting truss members with reduced channel section with reduced web, it is obtained optimized gyration radius in all axis directions, reduced section area facing the wind and lower drag coefficients. Therefore, due to the improvement in the aerodynamic and structural performance and behavior it is obtained a surprising reduction in the total weight of the structure, beside the reduction of the loads over the basement. These surprising effects are obtained even using the same silhouette of a prior art truss tower. Consequently, even for the same silhouette, a significantly more economical tower is obtained. Nevertheless, with the re-adequation of the silhouette design to the new aerodynamic and structural forces, the advantages of the present invention become even more significant. Moreover, the possibility of unrolling the metal sheets in automated machines for cutting, bending and perforating, allows significant manufacturing productivity gains, including the elimination of scrap.

DESCRIPTION OF DRAWINGS

The accompanying drawings are not necessarily drawn on scale. In the drawings, each identical or nearly identical component that is illustrated in various figures is represented by a like numeral. For purposes of clarity, not every component may be labelled in every drawing.

FIG. 01 is an extraction of the 'FIG. 1.1.' of the European Standard prEN 1993-3-1:2004.

FIG. 02 illustrates one exemplary embodiment of a channel section according to the invention.

FIG. 03 illustrates one exemplary embodiment of a channel section and a cowling according to the invention.

FIG. 04 illustrates a perspective view of an exemplary embodiment of a section of a triangular tower module according to the invention.

FIG. 05 illustrates a frontal view of an exemplary silhouette of a triangular tower.

FIG. 06 is an enlarged view of the detail 'A' of FIG. 05, illustrating one module of the tower.

FIG. 07 is an enlarged view of the detail 'B' of FIG. 06.

FIG. 08 is an enlarged view of the detail 'C' of FIG. 06.

FIG. 09 is an enlarged view of section 'DD' of FIG. 06.

FIG. 13 shows the Table II.3.

FIG. 15 shows the Table III.2.

FIG. 16 shows the Table III.3.

FIG. 19 shows the Table IV.3.

FIG. 20 shows the Table V with list of symbols.

MODE FOR INVENTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of 'including', 'comprising', 'having', 'containing' or 'involving', and variations thereof herein, is meant to encompass the items listed thereafter and equivalents thereof as well as additional items.

Figure 01:
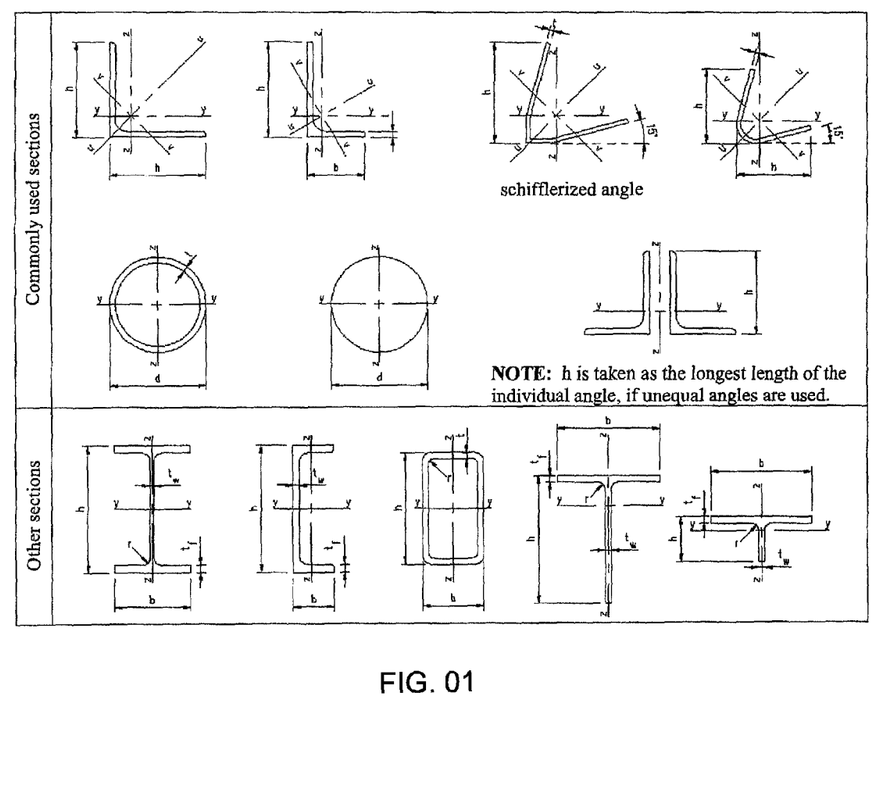

FIG. 01 is an extraction of the 'FIG. 1.1.' of the European Standard prEN 1993-3-1:2004—European Standard prEN 1993-3-1:2004—Eurocode 3: Design of steel structures, Part 3.1.: Towers, masts and chimneys—Towers and masts, which shows the 'Dimensions and axes of sections', including 'Commonly used sections' and 'Other sections'. Such common standard sections are well described in other handbooks and standards, and are usually adopted by the skilled in the art when designing truss towers.

Figure 02:
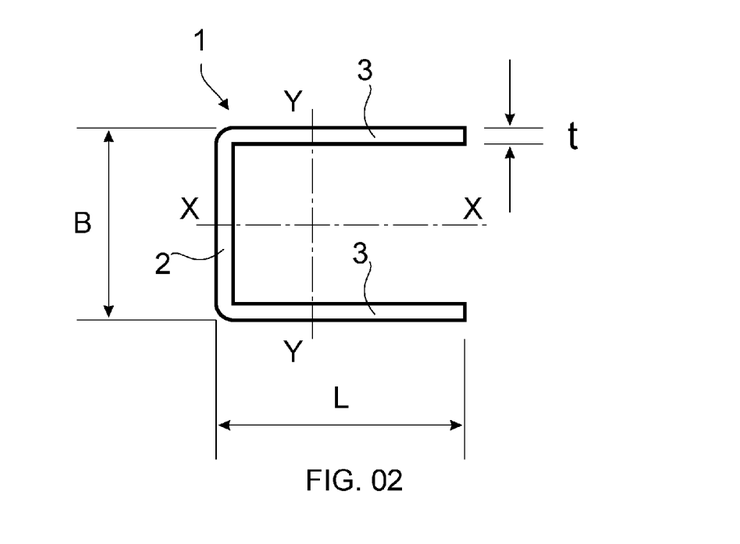

FIG. 02 illustrates one exemplary embodiment of the channel (1) section (also denominated as U-Section) with a reduced web (2) according the present invention. As shown, the length (B) of the channel (1) web (2) is smaller than the length (L) of the channel (1) legs (3), which therefore for the sake of simplicity, may be denominated as a 'channel section with reduced web'. In this example, the gyration radius is the same in all axes.

As shown in the example of FIG. 02, the reduced web (2) of the channel (1) section has rounded edges. In accordance with another aspect of the invention, channel (1) section with reduced web (2) has an aerodynamic profile.

In accordance with another aspect of the invention, the channel section with reduced web can have stiffener elements, which may be intermediary or in the edges.

Figure 03:
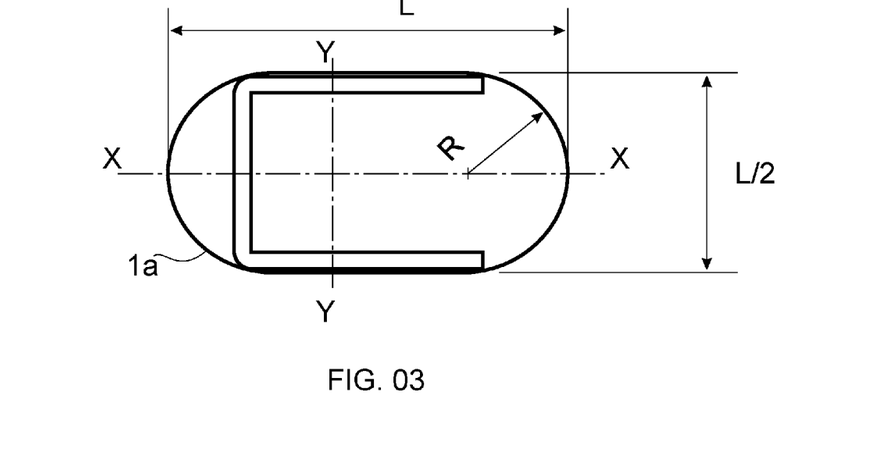

FIG. 03 illustrates one additional embodiment of the invention, wherein the channel section with reduced web is covered by a cowling (1a) with an oblong aerodynamic profile, which is the best for this case. The function of the cowling is to cover the channel section as an involucre, enhancing the aerodynamic of the metallic section with a low cost material an easy formation, such as polymers, composite materials or other materials.

Figure 04:
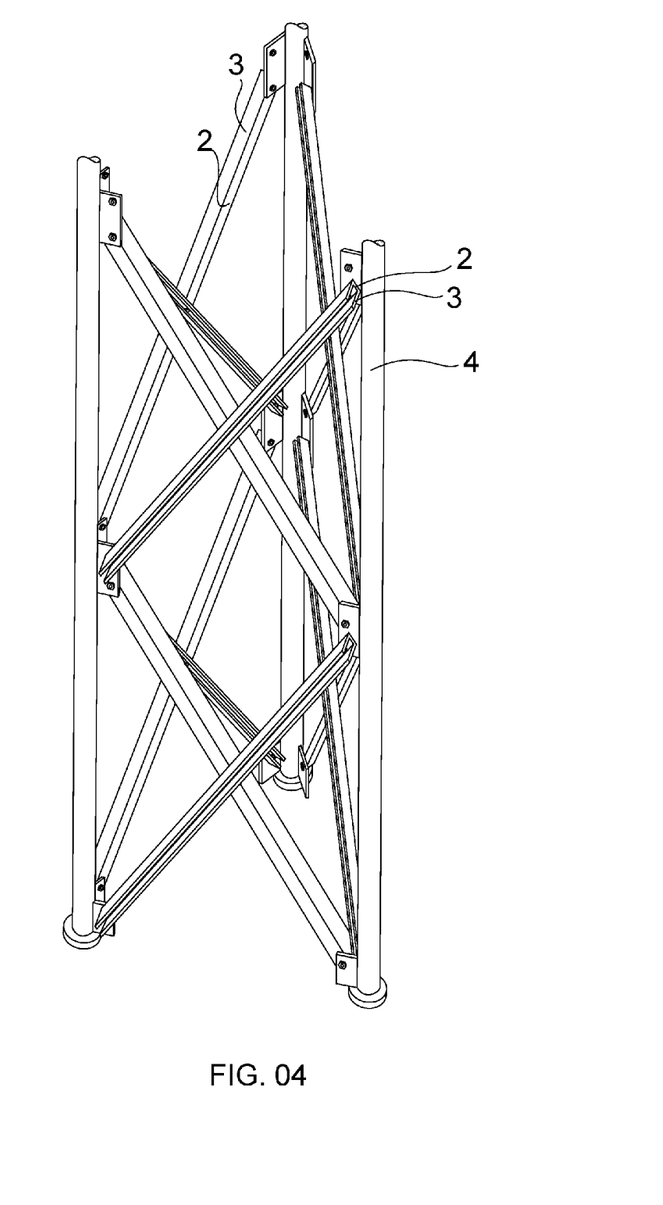

FIG. 04 illustrates a perspective view of a part of an exemplary section of a triangular tower module, with tubular columns (4). In this example, the truss members with channel (1) section with reduced web (2) are the bracing diagonal members.

Figure 05:
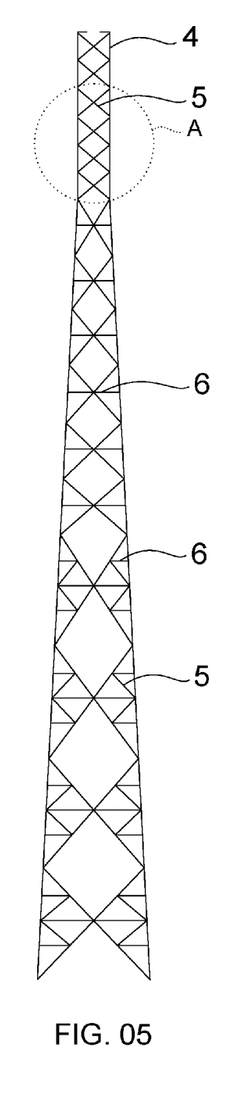
Figure 06:
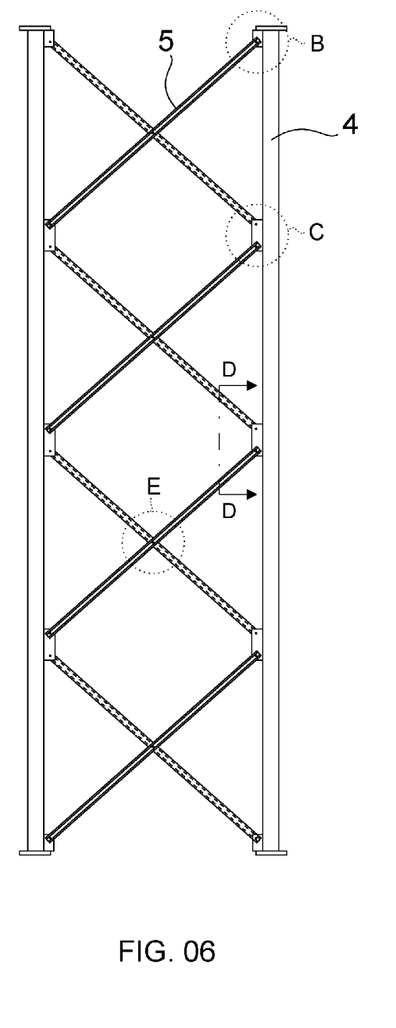
Figure 07:
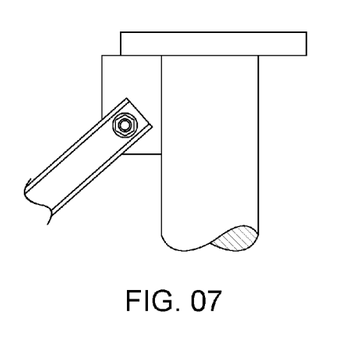
Figure 08:
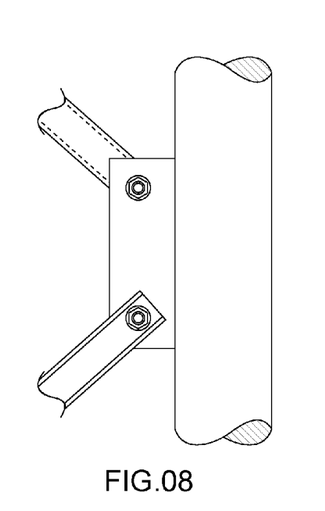
Figure 09:
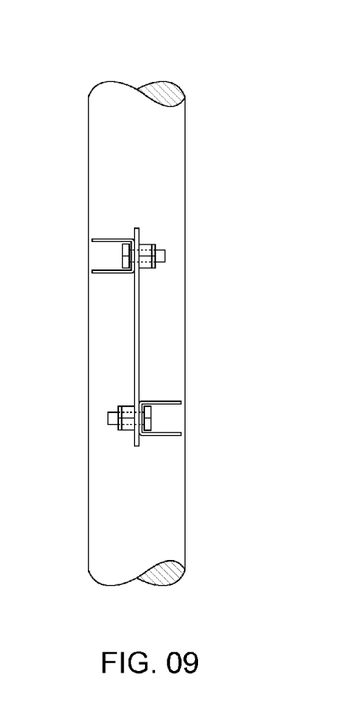
Figure 10:
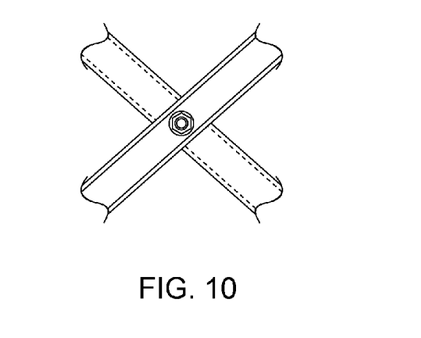
FIG. 10 is an enlarged view of the detail 'E' of FIG. 06.

FIG. 05 illustrates a frontal view (elevation) of an exemplary silhouette of a triangular tower. Those skilled in the art usually adopt for the bracing diagonal (5) members and horizontal bars (6) the 'Commonly used sections' and 'Other sections' as mentioned in FIG. 01. By contrast, in the exemplary embodiment of the module shown in FIG. 06 of the triangular tower of FIG. 05 and respective enlarged details shown from FIG. 06 through FIG. 10, the bracing diagonal (5) members are channel (1) sections with reduced webs (2). In accordance with one aspect of the invention, the lattice members with the channel (1) section with reduced web (2) can be horizontal bars (6).

Based in this disclosure, many possibilities of design may be apparent for a skilled in the art, such as combining reduced web (2) bracing diagonal (5) members with reduced web (2) horizontal bars (6); as well combining reduced web (2) channel (1) sections with prior art standard sections. All such combinations are also intended to be encompassed by the invention and following claims.

Other modifications in the details of construction may be possible. For instance, the bolts and nuts connections shown in the enlarged views of FIGS. 06 through FIG. 10 may be substituted by welded joints, groove coupling or any other suitable connection means. Another example of possible substitution would be the top flange shown in FIG. 05, which may be substituted by a slip-joint connection system, for instance. The vertical columns (tower support leg members) may be of any other adequate section for each case. The quantity and displacement of the vertical columns may vary, being more common three columns forming an equilateral triangle or four columns in quadrangular format. Other variations in the components and project may be possible according the application.

TABLE I

| SECTION | Dimensions | $B_{mm}$ | $H_{mm}$ | $t_{mm}$ | $I10^3{}_{mm}{}^4$ |
|---|---|---|---|---|---|
| L | 2' × 2' × 3/16' | 50.8 | 50.8 | 4.76 | 46.72 |
| U | 36' × 48' × 1.5' | 36 | 48 | 1.5 | 47.4 |

| SECTION | $S_{mm}{}^2$ | $i_{mm}$ | R(kN) | Pkg/m | $A_{mm}{}^2$ |
|---|---|---|---|---|---|
| L | 458 | 10.1 | 21.19 | 3.64 | 76200 |
| U | 194 | 15.65 | 21.47 | 1.52 | 54000 |

For illustrative purposes and non-limiting, in the Table 1 there are shown the characteristics of a channel section with reduced web, identified as "U", according to one ex-emplificative embodiment of the invention, compared to a angle section with equal legs, identified as "L", usually adopted in the prior art.

In this example, the sections were projected to support the same 21 kN axial compression load, with distance between rotulas of L=1.5 m. For the sake of simplicity, it was adopted buckling stress given by the equation $T=10.4 \times 10^6/Y^2$ for Y>86 where Y=L/i and L=distance between rotulas and i=gyration radius.

The Table 1 shows three very important aspects: a) the strength of the channel section with reduced web is 3% greater than the 'L' angle section; b) the weight of the channel section with reduced web is 33% lower than the weight of the 'L' angle section; and c) the wind load over the channel section with reduced web is 41% lower than the 'L' angle section. The synergy due to these three factors: substantial maintenance of the strength, or even increase of the strength; reduction of the dead weight of the section; and reduction of the wind loads over the structure, provide a surprising improvement in the performance of the entire structure, with the possibility of increasing the self-frequency of the tower and reducing the costs of the tower and of the basement.

For illustrative and exemplificative purposes, not limiting the present invention, FIGS. 11 through 20 show dimensioning spreadsheets and labels for three 70 meters high self-supporting triangular towers with the same silhouette as the exemplary tower of FIG. 04, with frusto-conical columns and three modes of trusses for the same loads.

Figure 11:
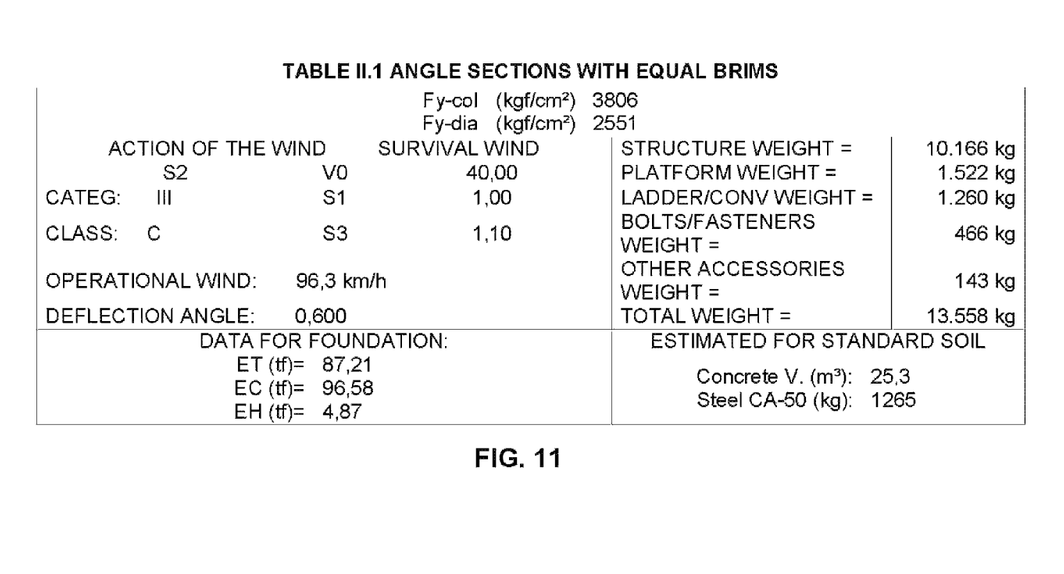
FIG. 11 shows the Table II.1.
Figure 12:
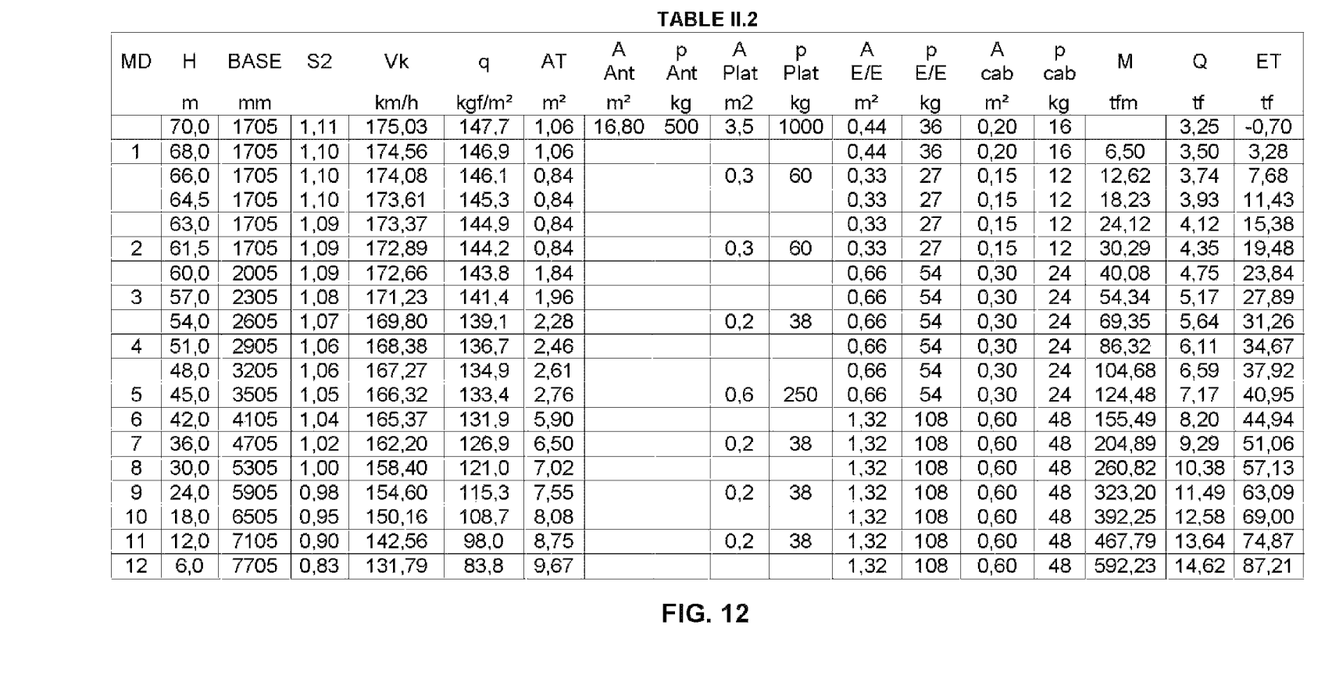
FIG. 12 shows the Table II.2.
Figure 14:
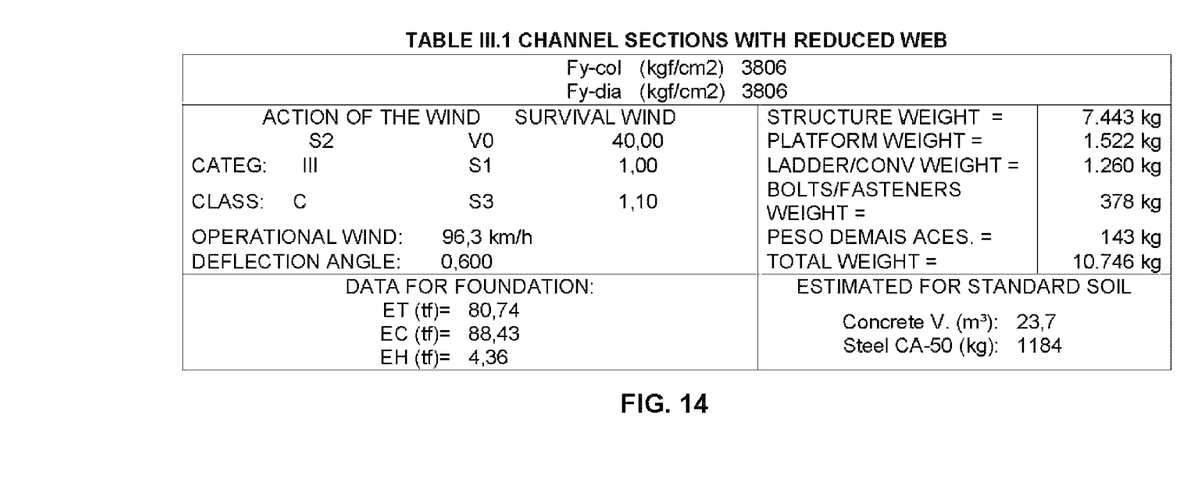
FIG. 14 shows the Table III.1.
Figure 17:
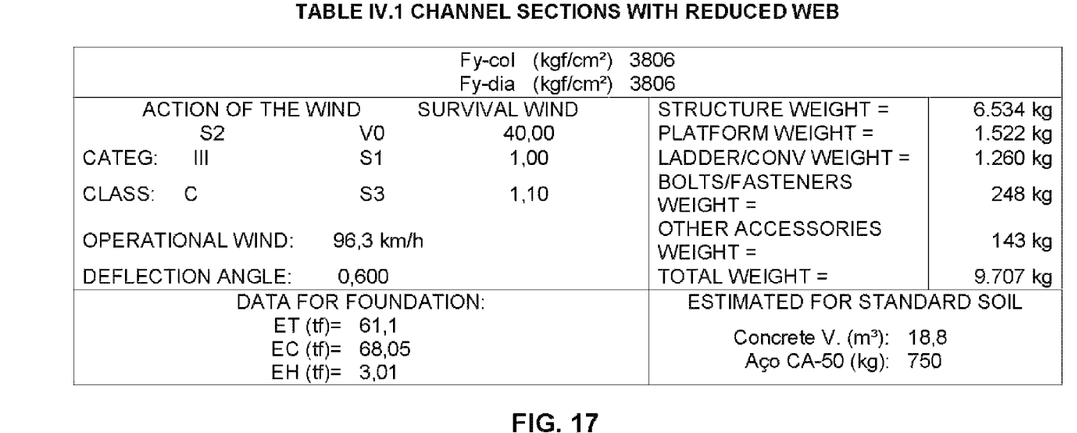
FIG. 17 shows the Table IV.1.
Figure 18:
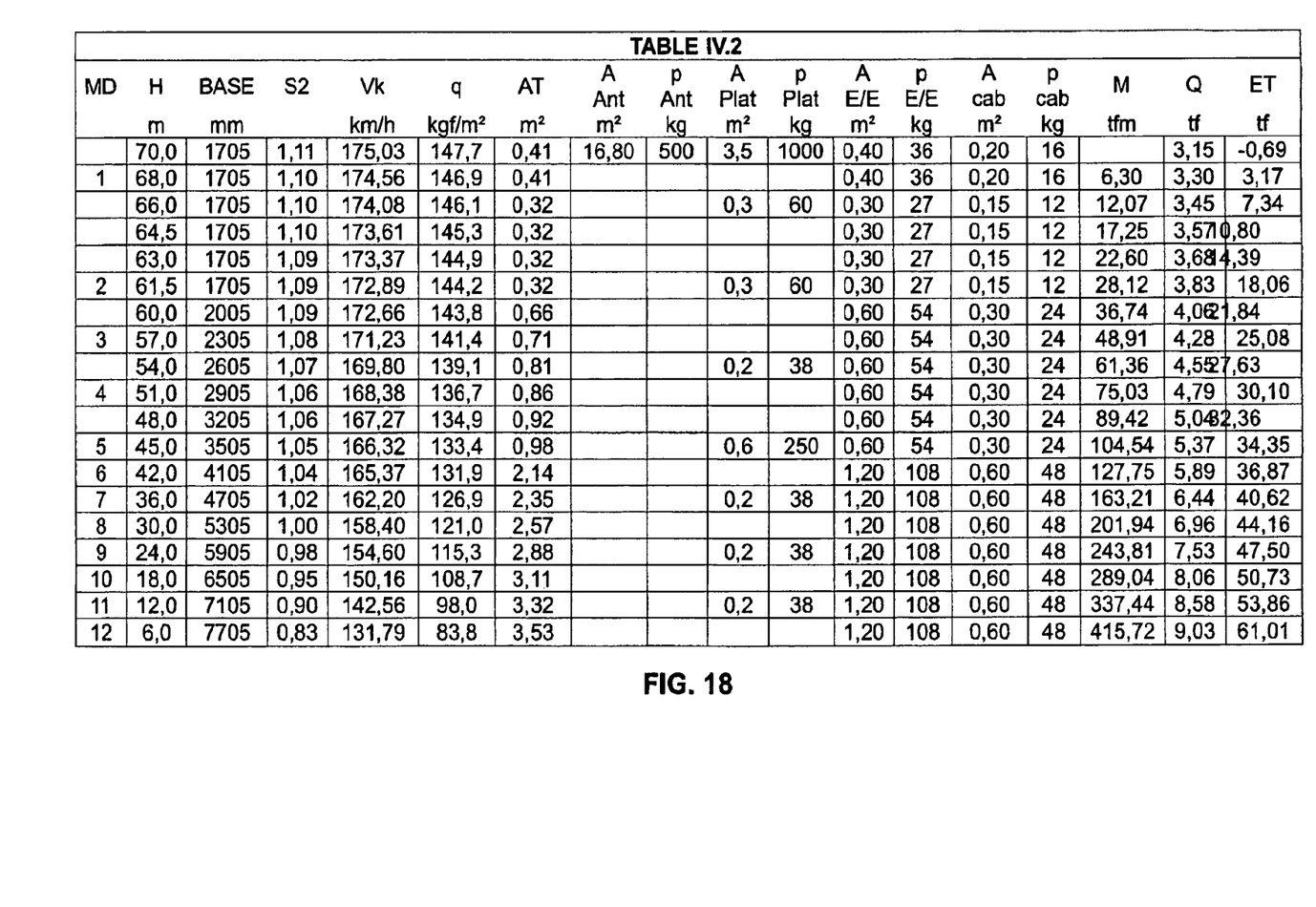
FIG. 18 shows the Table IV.2.

In the Tables II.1-3, FIGS. 11 to 13, the truss members used are angle sections with equal legs according the prior art. The total weight of the tower would result in 13.558 kg (133 kN). In the Tables III.1-3, FIGS. 14 to 16, the truss members, diagonal braces and horizontal bars, used are channel sections with reduced web. The total weight of the tower would result in 10.746 kg (105 kN). In the Tables III.1-3, FIGS. 17 to 19, the truss members, diagonal braces and horizontal bars, used are channel sections with reduced web with aerodynamic cowlings according FIG. 03. The total weight of the tower would result in 9.707 kg (95.2 kN).

Therefore, due to the improvement in the aerodynamic and structural performance and behavior it is obtained a surprising reduction in the total weight of the structure, beside the reduction of the loads over the basement. This surprising effects are obtained even using the same silhouette of a prior art truss tower. Consequently, even for the same silhouette, a significantly more economical tower is obtained.

While the invention has been disclosed by this specification, including its accompanying drawings and examples, various equivalents, modifications and improvements will be apparent to the person skilled in the art. Such equivalents, modifications and improvements are also intended to be encompassed by the following claims.

The invention claimed is:

1. A metallic tower comprising lattice members attached to a plurality of substantially vertical leg members, the lattice members being formed from a channel section with reduced web, wherein the channel section with reduced web comprises a channel web and a pair of legs attached to the channel web, wherein a length of the channel web is smaller than a length of each of the pair of legs, and wherein the channel section with reduced web has substantially equal gyration radii taken from any axes that are parallel to a cross-sectional plane through the channel section with reduced web and which intercept a centroid of the cross-sectional plane.

2. The metallic tower according to claim 1, wherein the lattice members form bracing diagonal members of the metallic tower.

3. The metallic tower according to claim 1, wherein the lattice members form horizontal bars of the metallic tower.

4. The metallic tower according to any of claims 1-3, wherein the lattice members are positioned in the metallic tower with a surface of the channel web facing a predominantly horizontal wind direction.

5. The metallic tower according to any of claims 1-3, wherein the channel section with reduced web has rounded edges.

6. The metallic tower according to any of claims 1-3, wherein the channel section with reduced web is covered by a cowling having an optimized aerodynamic profile.

7. The metallic tower according to any of claims 1-3, wherein the pair of legs are substantially parallel to one another and perpendicular to the channel web.

* * * * *